United States Patent
Harllee, III (10) Patent No.: US 8,896,961 B1
(45) Date of Patent: Nov. 25, 2014

(54) READER POSITIONING IN SHINGLED MAGNETIC RECORDING

(71) Applicant: Seagate Technology LLC, Cupertino, CA (US)

(72) Inventor: Peter S Harllee, III, Boulder, CO (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 13/803,054

(22) Filed: Mar. 14, 2013

Related U.S. Application Data (60) Provisional application No. 61/712,257, filed on Oct. 11, 2012.

(51) Int. Cl.
  *G11B 5/596* (2006.01)
  *G11B 21/02* (2006.01)
  *G11B 21/08* (2006.01)

(52) U.S. Cl.
  CPC ..................................... *G11B 21/08* (2013.01)
  USPC ......................................... 360/77.02; 360/75

(58) Field of Classification Search
  None
  See application file for complete search history.

(56) References Cited

U.S. PATENT DOCUMENTS

| | | | |
|---|---|---|---|
| 6,185,063 B1 * | 2/2001 | Cameron | 360/78.04 |
| 7,231,497 B2 | 6/2007 | Trika | |
| 7,440,221 B2 | 10/2008 | Tsuchinaga | |
| 7,965,465 B2 | 6/2011 | Sanvido | |
| 7,966,456 B2 | 6/2011 | Trika | |
| 7,970,989 B2 | 6/2011 | Matthews | |
| 7,982,994 B1 | 7/2011 | Erden | |
| 8,179,627 B2 | 5/2012 | Chang | |
| 8,270,256 B1 | 9/2012 | Juang | |
| 8,300,341 B2 | 10/2012 | Itakura | |
| 8,310,786 B2 | 11/2012 | Fuente | |
| 2005/0144396 A1 | 6/2005 | Eschmann | |
| 2011/0085266 A1 | 4/2011 | Kanai | |
| 2011/0138106 A1 | 6/2011 | Prabhakaran | |
| 2011/0292545 A1 | 12/2011 | Katada | |
| 2011/0299373 A1 | 12/2011 | Ho | |
| 2012/0060073 A1 | 3/2012 | Itakura | |
| 2012/0069466 A1 | 3/2012 | Okamoto | |
| 2012/0099216 A1 | 4/2012 | Grobis | |
| 2012/0162808 A1 | 6/2012 | Masuda | |
| 2012/0194937 A1 | 8/2012 | Tagami | |

(Continued)

OTHER PUBLICATIONS

Design Issues for a Shingled Write Disk System, Ahmed Amer, et al.; © 2010 IEEE.

(Continued)

*Primary Examiner* — Andrew L Sniezek
(74) *Attorney, Agent, or Firm* — Cesari & Reed LLP; Kirk A. Cesari; Christian W. Best (57) ABSTRACT

Systems and methods are disclosed for positioning of a reader element in a data storage device employing shingled recording. In an embodiment, a system may comprise a data storage medium configured to store data in a shingled manner where at least one track is partially overlapped by an adjacent track, a read element to read data from the data storage medium, and a processor. The processor may be configured to receive a read command to retrieve data from the data storage medium, and when the data is stored to a shingled portion of the data storage medium, adjust a position of the read element according to a squeeze offset value based on an amount of overwrite of a shingled data track by an adjacent data track.

18 Claims, 6 Drawing Sheets

(56) References Cited

U.S. PATENT DOCUMENTS

| | | |
|---|---|---|
| 2012/0212847 A1 | 8/2012 | Sato |
| 2012/0233432 A1 | 9/2012 | Feldman |
| 2012/0250174 A1 | 10/2012 | Sueishi |
| 2012/0300328 A1 | 11/2012 | Coker |
| 2012/0300333 A1 | 11/2012 | Tinker |
| 2012/0303867 A1 | 11/2012 | Hall |
| 2012/0303884 A1 | 11/2012 | Hall |
| 2012/0303889 A1 | 11/2012 | Coker |
| 2012/0303928 A1 | 11/2012 | Hall |
| 2012/0307400 A1 | 12/2012 | Kawabe |
| 2013/0027802 A1 | 1/2013 | Kim |
| 2013/0027806 A1 | 1/2013 | Cho |
| 2013/0031296 A1 | 1/2013 | Na |
| 2013/0031306 A1 | 1/2013 | Kim |
| 2013/0031317 A1 | 1/2013 | Ryu |
| 2013/0031406 A1 | 1/2013 | Cho |
| 2013/0038960 A1 | 2/2013 | Song |
| 2013/0038961 A1 | 2/2013 | Song |

OTHER PUBLICATIONS

Emulating a Shingled Write Disk, Rekha Pitchumani, et al., International Symposium on Modeling, Analysis, and Simulation of Computer and Telecommunication Systems, At Washington, DC (Aug. 2012).

* cited by examiner

READER POSITIONING IN SHINGLED MAGNETIC RECORDING

CROSS REFERENCE TO RELATED APPLICATIONS

The present application claims priority to U.S. provisional patent application Ser. No. 61/712,257, filed Oct. 11, 2012, entitled "Reader Positioning in Shingled Magnetic Recording," the contents of which are hereby incorporated by reference in their entirety.

BACKGROUND

The present disclosure relates to data storage mediums, and provides systems and method for improving data storage device performance, especially when using shingled magnetic recording.

SUMMARY

In one embodiment, an apparatus may comprise a processor configured to receive a read command to retrieve data from a data storage medium, the data stored in a shingled manner where at least one track is partially overlapped by an adjacent track, and adjust a position of a read element according to a squeeze offset value based on an amount of overwrite of a shingled data track by an adjacent data track.

In another embodiment, a method may comprise receiving at a data storage device a read command to retrieve data from a data storage medium, the data stored in a shingled manner where at least one track is partially overlapped by an adjacent track. The method may further comprise adjusting a position of a read element according to a squeeze offset value, the squeeze offset value based on an amount of overwrite of a shingled data track by an adjacent data track.

In yet another embodiment, a system may comprise a data storage medium configured to store data in a shingled manner where at least one track is partially overlapped by an adjacent track, a read element to read data from the data storage medium, and a processor. The processor may be configured to receive a read command to retrieve data from the data storage medium, and when the data is stored to a shingled portion of the data storage medium, adjust a position of the read element according to a squeeze offset value based on an amount of overwrite of a shingled data track by an adjacent data track.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
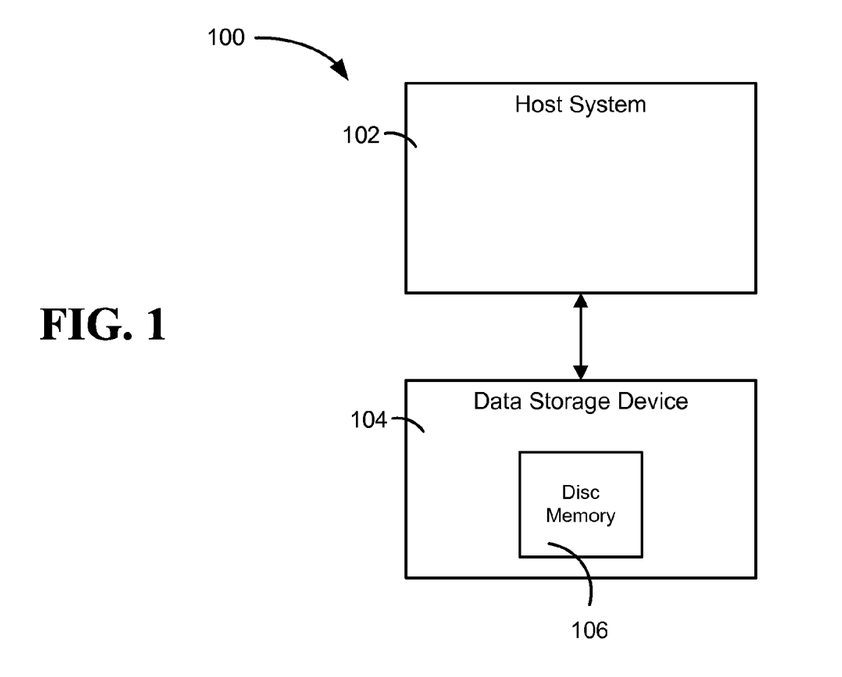
FIG. 1 is a diagram of an illustrative embodiment of a system for reader positioning in shingled magnetic recording (SMR)

FIG. 1 depicts an embodiment of a system for reader positioning in shingled magnetic recording, generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a standalone device not connected to a host 102, or the host 102 and DSD 104 may both be part of a single unit.

The DSD 104 can include one or more nonvolatile memories 106. In the depicted embodiment, the DSD 104 is a hard disc drive (HDD) including a rotating disc memory 106. In other embodiments, the DSD 104 may contain additional memories or memory types, including volatile and nonvolatile memories. For example, DSD 104 could be a hybrid HDD with both a disc memory and a nonvolatile solid state memory.

In some embodiments, DSD 104 may have one or more discs 106 having tracks for storing data. A disc 106 may be divided into multiple zones, each with a plurality of tracks. Each track can be further divided into a plurality of logical block addresses (LBAs), with chunks of data written to each LBA. Each zone may have different configurations of various options, such as data track format, direction of writing from a transducer, data density, or intended uses. For example, a disc may have a zone designated as a media cache intended for sequential storage of data in a non-shingled track manner. The disc may also have one or more zones designated for data storage in a shingled track manner using shingled magnetic recording (SMR) as discussed below. The disc may further have at least one zone designated for spare sectors.

In an embodiment of system 100, the disc memory 106 has one or more zones configured to store data on shingled data tracks using SMR. SMR is a recording method used to increase data recording density on a disc, whereby a track of data partially overlaps an adjacent data track. SMR will be discussed in more detail with regard to FIGS. 2-4.

Figure 2:
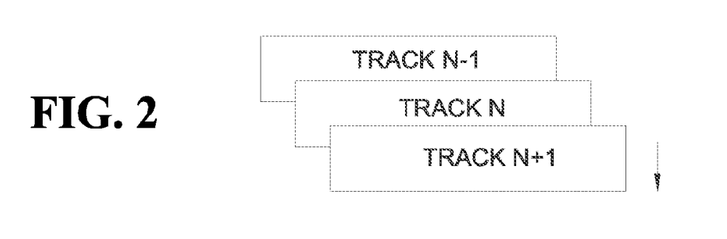
FIG. 2 is a diagram of another illustrative embodiment of a system for reader positioning in SMR.

SMR is a scheme of executing a write operation in one radial direction across a disc (i.e. tracks are written one at a time moving from the inner diameter towards the outer diameter, or vice-versa), where tracks partially overlap each other similar to roofing shingles. Referring to FIG. 2, if it is assumed that writing is performed in the arrow-indicated direction in the shingle-write scheme, when writing to track N, adjacent track N−1 is partially overwritten. Similarly, when writing is performed on track N+1, adjacent track N is partially overlapped. In contrast to recording methods where each track is written without any overlap, SMR may result in increased recording density due to a higher tracks per inch (TPI) characteristic in a radial direction of a storage medium.

Figure 3:
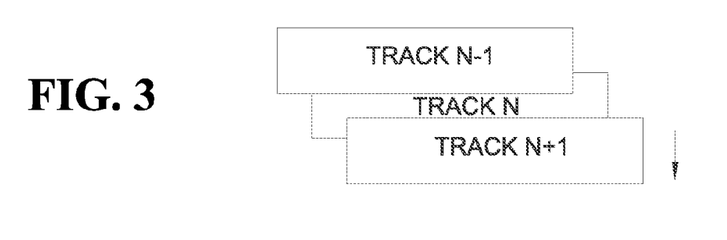
FIG. 3 is a diagram of another illustrative embodiment of a system for reader positioning in SMR.

Due to the overlapped nature of shingled tracks, writes should only be performed in one direction for a given set of shingled tracks. As illustrated in FIG. 3, after writing on track N, if track N−1 is written in a reverse direction of the shingled recording direction, track N may become unreadable due to Adjacent Track Interference (ATI). Therefore, it may be advantageous to follow a constraint that track N−1 should not be written after track N is written. Accordingly, writing or modifying data on track N−1 after track N is recorded, or on track N after track N+1 is recorded, requires a different writing strategy than with non-shingled tracks, which can simply be overwritten at any time.

Figure 4:
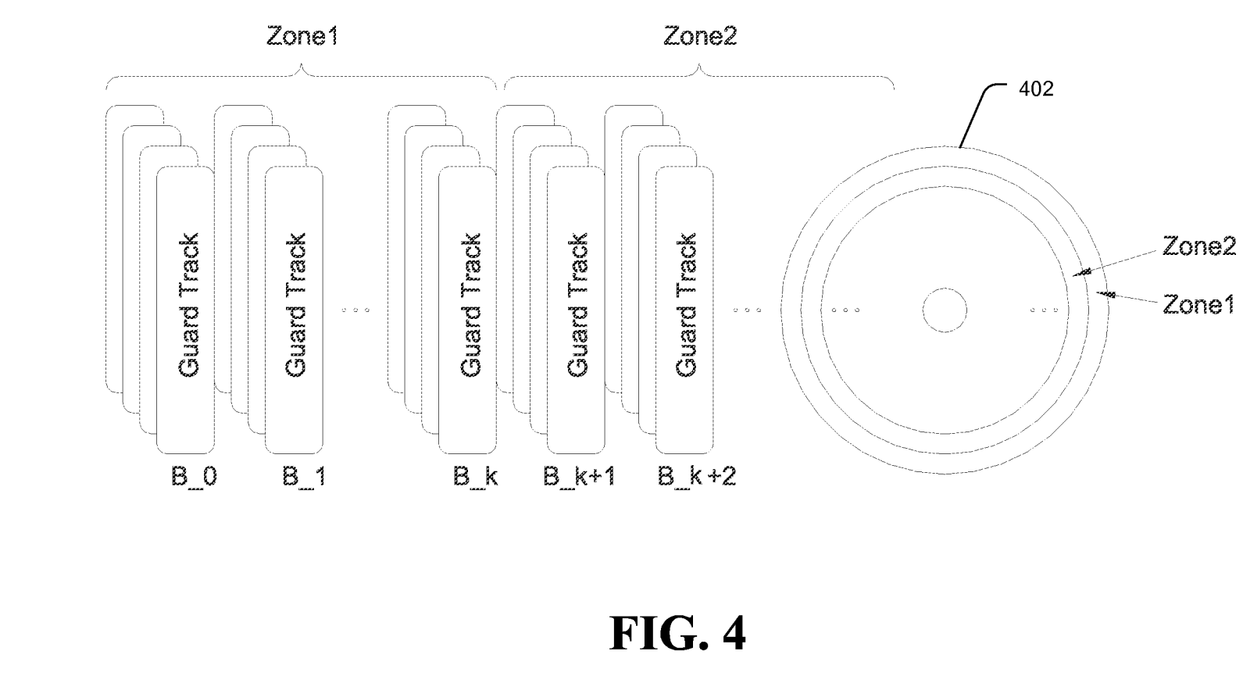
FIG. 4 is a diagram of another illustrative embodiment of a system for reader positioning in SMR.

Turning now to FIG. 4, a diagram of another illustrative embodiment of a system for reader positioning in shingled magnetic recording is depicted. Rotating disc media 402 may be divided into a plurality of zones (e.g. Zone 1, Zone 2, etc.), and each zone may contain a plurality of data tracks.

Due to the single-write direction of SMR, writing a given track N−1 after track N has been written may require rewriting all shingled tracks that following track N−1 (i.e. track N, track N+1, track N+2, etc.). In order to accomplish this realistically, a set of tracks may be grouped into a "band," with the band ending with a guard track. In some embodiments, the guard track can be a non-shingled track, or a shingled track which is not used to store data. When track N−1 needs to be re-written, tracks N−1 to the Guard Track can be rewritten, while tracks in other bands are not affected. Accordingly, the tracks in each zone may be divided into a plurality of bands. As depicted in FIG. 4, Zone 1 contains Band 0 (B_0) through Band k (B_k), while Zone 2 contains Band k+1 (B_k+1), Band k+2 (B_k+2), etc. In an example embodiment, each zone may contain 100 data tracks, and the 100 data tracks are divided into 10 bands containing 10 tracks each.

Disc-based media may use a read-write head positioned on an actuator arm to read and write data to a disc. The head can be positioned along a selected track and write data to or read data from the track. The head often has a separate read component and write component (which may be referred to as a read head or write head), which can be slightly separated spatially. Therefore, the heads may have to be adjusted slightly to be properly positioned over a track depending on whether the read head or the write head is currently being employed. This reader-to-writer offset can also be called "head offset," "geometry offset," "microjog," or "geometry microjog." For non-shingled media, both the read head and the write head can be positioned over the center of the non-shingled tracks. In such embodiments, geometry microjog may be the only consideration necessary for proper head positioning. Geometry microjog is often calculated based on a radius of the disc media.

Figure 5:
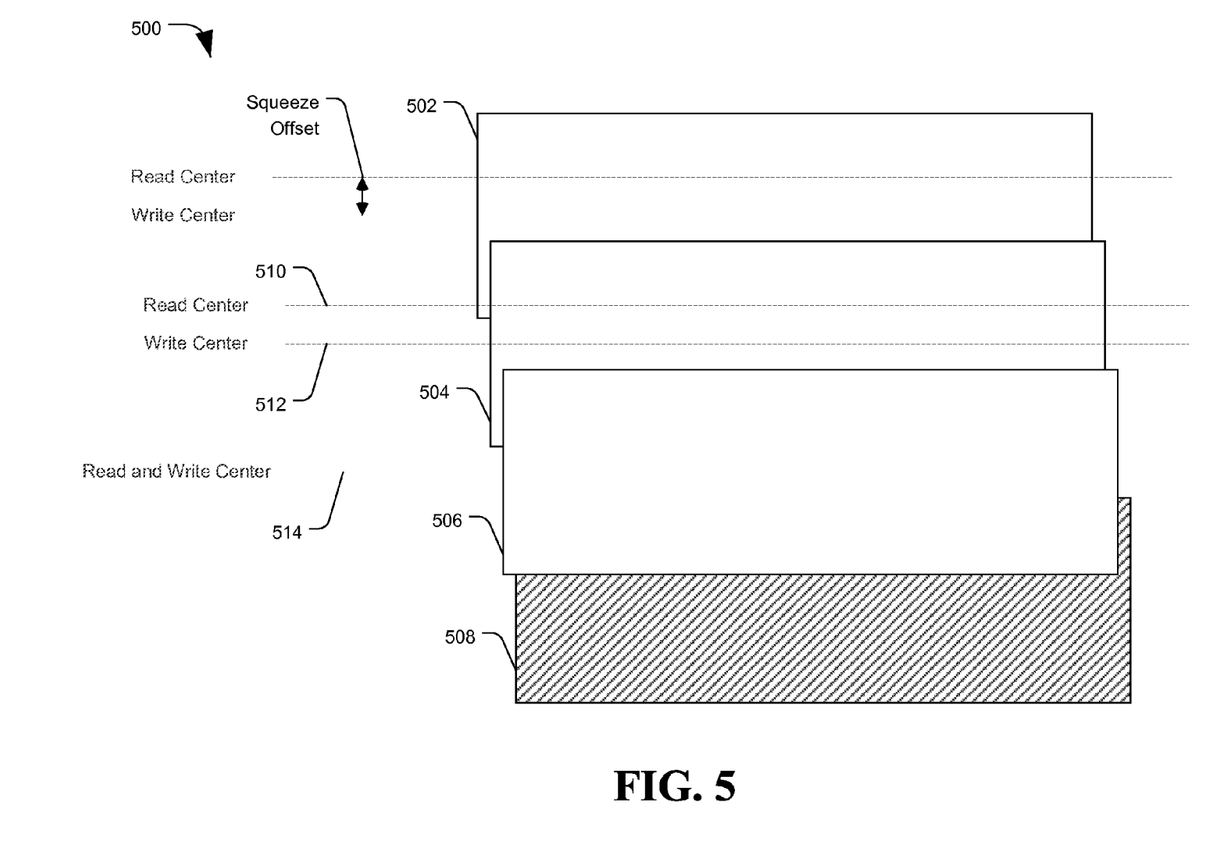
FIG. 5 is a diagram of another illustrative embodiment of a system for reader positioning in SMR.

Turning now to FIG. 5, an illustrative embodiment of a system for reader positioning in shingled magnetic recording is depicted and generally designated 500. System 500 shows a number of shingled tracks from a single band. The band may include shingled data tracks 502, 504, and 506, as well as guard track 508.

As discussed above, shingled media can have one data track partially overwrite an adjacent data track. For example, one data track 504 may overwrite ten percent, fifteen percent, or twenty percent of an adjacent track 502. When writing to shingled tracks, the write head may be positioned over the center of a track 512, regardless of the shingled characteristic. When reading from shingled tracks, however, it may be desirable to center the read head over the non-overlapped portion of a track, at 510, rather than over the center of a track 512. This may reduce the likelihood of reading bad data by picking up data recorded on the adjacent overwriting track. In some embodiments, the last data track in a band 506, which should not be partially overlapped by any other track, can be treated as a non-shingled data track with a single read and write center 514.

The distance between the center of a shingled track 512 and the center of the non-overlapped portion of the track 510 (i.e. the portion of the track not overlapped by an adjacent track) may be called the "squeeze offset," "shingle offset," or the "squeeze microjog." The amount of the squeeze mircojog may have very little to do with the radius of the data storage media, unlike regular microjog. Instead, the squeeze microjog may be dependent on the amount of overlap between shingled tracks.

Therefore, optimally positioning a read head over a shingled track can be based on two values: a geometry microjog value based on the spatial distance between the write head and the read head as well as the disc radius, and a squeeze microjog value based on the amount of overlap between shingled tracks.

Figure 6:
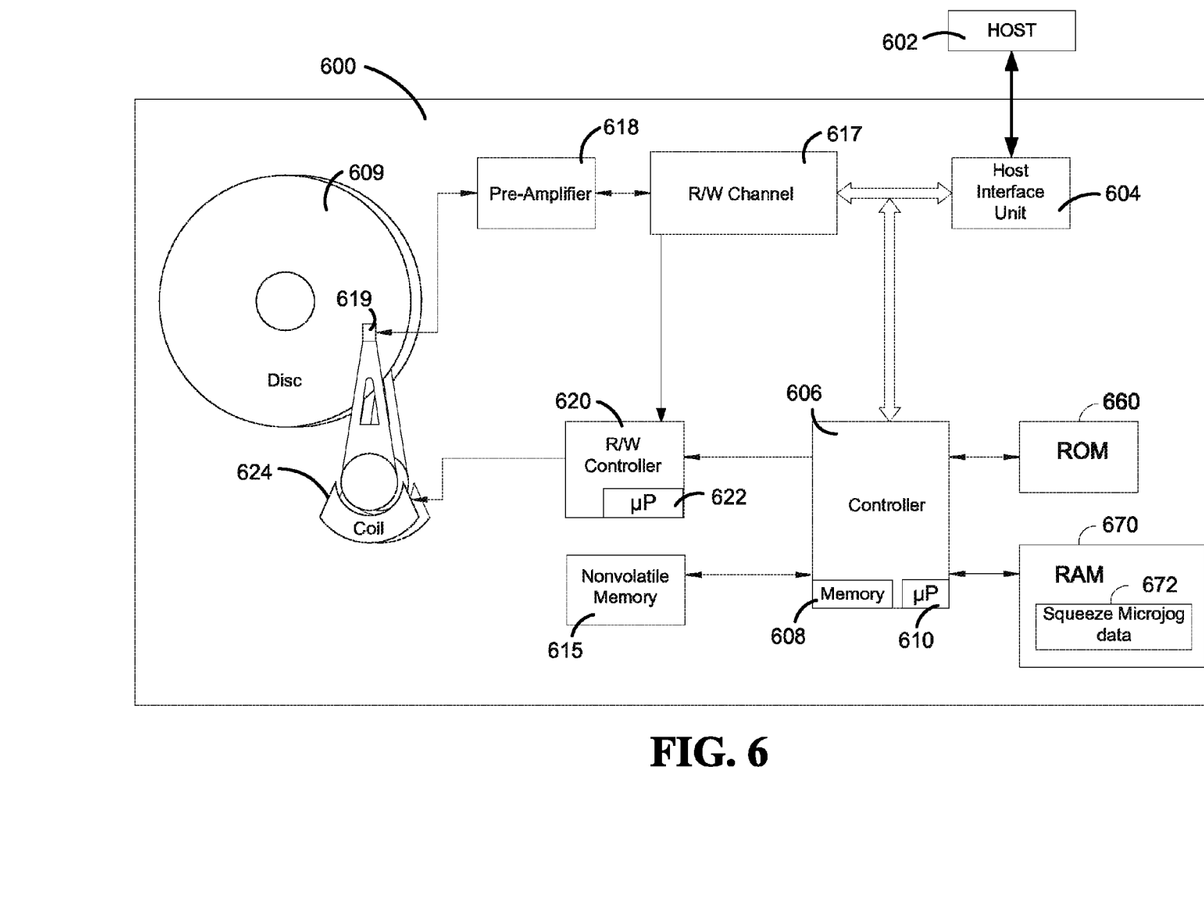
FIG. 6 is a diagram of another illustrative embodiment of a system for reader positioning in SMR.

FIG. 6 depicts a diagram of an illustrative embodiment of a system for reader positioning in shingled magnetic recording, generally designated 600. Specifically, FIG. 6 provides a functional block diagram of a disc drive data storage device (DSD). The DSD 600 can be a desktop computer, a laptop computer, a server, a personal digital assistant (PDA), a telephone, a music player, any other device which may be used to store or retrieve data, or any combination thereof. The DSD 600 can optionally connect to a host device 602, which can similarly be a desktop computer, a laptop computer, a server, a personal digital assistant (PDA), a telephone, a music player, another electronic device, or any combination thereof. The data storage device 600 can optionally communicate with the host device 602 via a hardware/firmware based host interface circuit 604 that may include a connector (not shown) that allows the DSD 600 to be physically removed from the host 602.

The DSD 600 can include a programmable controller 606 with associated memory 608 and processor 610. Further, FIG. 6 shows the DSD 600 can include a read/write (R/W) channel 617, which can encode data during write operations and reconstruct data retrieved from disc(s) 609 during read operations. A preamplifier/driver circuit (preamp) 618 can apply write currents to the head(s) 619 and provides pre-amplification of readback signals. A read/write control circuit 620 may use servo data to provide the appropriate current to the coil 624 to position the head(s) 619 over the disc(s) 609. The controller 606 can communicate with a processor 622 to move the head(s) 619 to the desired locations on the disc(s) 609 during execution of various pending commands. The DSD 600 may also include a ROM 660 and RAM 670. The ROM 660 may store firmware for controlling the DSD 600 and control data, and the RAM 670 may store firmware loaded from the ROM 660 during drive operation, programs loaded from the disc(s) 609, and other temporary data. In some embodiments, the DSD 600 may also include a non-volatile memory 615, such as when the DSD 600 is a hybrid drive with nonvolatile solid state memory 615 in addition to the disc(s) 609.

In one embodiment, the squeeze microjog may vary on a by-head and by-zone basis. On a read event, the head and zone of the track may be determined and the squeeze microjog read from memory and added to the commanded position of the read element. For example, the DSD 600 may use target addresses of data requested in a read command to determine in which zone the data is located, and which head will be used to read the data. In an embodiment, the DSD 600 can use the zone and head information to look up squeeze microjog values for that zone and head using a table stored in memory. The microjog values may be applied by a read-write controller.

In an example embodiment, a read command including target LBAs may be received from the host 602 via the host interface 604. The controller 606 may determine which zone of the disc 609 contains the LBAs, and which head 619 will be used to read the appropriate zone. The controller 606 may consult a table containing squeeze microjog data 672, which may be stored in RAM 670, to find the appropriate squeeze microjog value for the target zone and head. The squeeze microjog data 672 may be loaded to RAM 670 from the ROM 660 when the DSD 600 is started up, for example if the squeeze microjog is determined when the DSD 600 is manufactured. In another embodiment, the squeeze microjog data 672 may be stored in a nonvolatile solid state memory 615, which may allow the microjog data 672 to be updated or determined after device manufacture. Other implementations and storage options may be employed.

The controller 606 may pass the appropriate squeeze microjog value(s) for the target zone(s) and head(s) to the R/W controller 620. The R/W controller 620 may add the squeeze microjog value(s) to the geometry microjog, for example using processor 622, to obtain a total microjog value. The R/W controller 620 can use the total microjog value to adjust the position of the read head 619 over the target tracks to read the data.

In another embodiment, squeeze microjog may only be applied to the shingled tracks in a band. The last track in a band is not shingled, or "squeezed," because it is not partially overlapped by any other track. See track 506 of FIG. 5. Similarly, discs may have non-shingled zones. Therefore, the optimum position of the reader may have no squeeze microjog applied for non-shingled tracks. For example, no squeeze microjog value may be saved or added to the positioning calculation for non-shingled tracks, or a squeeze microjog value of 0 could be stored and added. In some embodiments, the squeeze microjog value for non-shingled tracks may be a nominal value such as a baseline value that doesn't change or value of zero or approximately zero.

Separating the geometry microjog from the squeeze microjog may allow much more flexibility in zone track layouts. One zone can be shingled with a high amount of overlap, while the next zone may have less overlap or no shingling at all. In some embodiments, the microjog values stored in memory may be a combination of the squeeze offset value and the geometry offset value for each entry.

In some embodiments, the squeeze offset may be estimated based on single-sided track pitch (TPss) and double-sided track pitch (TPdss) measurements, such as by taking half the difference between the two measurements. For example, the double-sided track pitch TPdss may be the track pitch for unshingled tracks to meet a target bit error rate, while the single-sided track pitch TPss may be the track pitch for shingled tracks written in a single direction, likewise to meet a target error rate. To phrase it another way, the TPdss may be the track pitch used when writing a shingled track, while the TPss may be the approximate track pitch used to read the non-overlapped portion of a shingled track. So if a TPdss is 10, and the TPss is 6, a starting offset estimate may be (TPdss−TPss)/2, or (10−6)/2=2. In some embodiments, a double-sided track pitch capability (TPCdss) may be used instead of the TPdss, where the TPCdss may be the capability of an individual write head to write a track without exceeding a target error rate, which may be a lower value than the TPdss at which the tracks are actually formatted.

An estimate may be fine-tuned by starting with the estimate and testing the results at different percentage intervals to find the best results. For example, if the squeeze offset estimate is 2, shingled tracks may be read with a squeeze offset of 2 and the bit error rate (BER) can be measured. If the error rate is unsatisfactory, the estimate value may be modified by, e.g. 5%. So the BER could be measured when using a squeeze offset of 2.1, or 1.9, and continually tweaked until a target BER is achieved. The squeeze offset amount may then be stored to a memory, such as ROM 660 or nonvolatile memory 615, for use during device operation.

The squeeze microjog for each zone may be dependent on the variable bit aspect ratio (VBAR) test selections for each zone, which may identify the double-sided and single-sided track pitches (e.g. TPdss and TPss) for the zone. That is, a DSD may store values for disc zones used to calculate the location of each track in the zone, such as TPss, guard track pitch, and number of tracks per band. A squeeze microjog value could also be stored in such a table to facilitate track reading. Therefore, having squeeze microjog values stored on the same basis as VBAR selections may be beneficial. In some embodiments, TPdss or TPCdss may be stored, and the squeeze microjog value could be calculated at run time. However, this could require additional calculations at run time, and may not allow for the tweaks from the estimated squeeze offset as described above.

Figure 7:
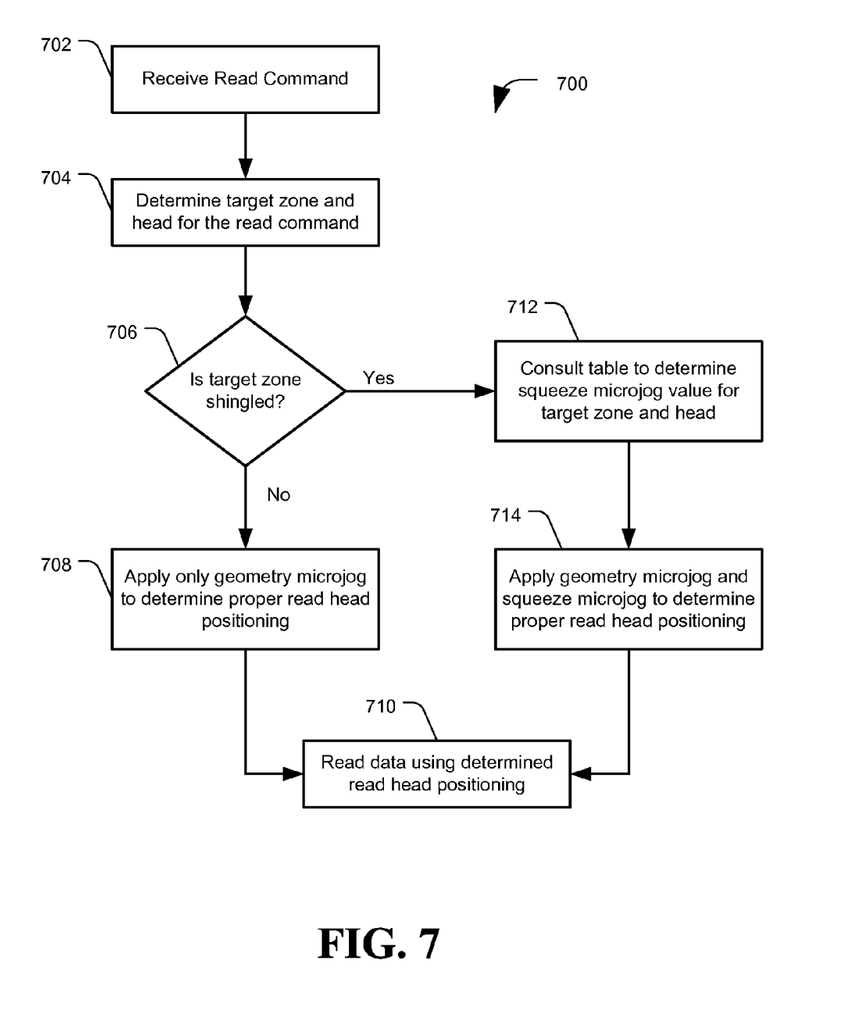
FIG. 7 is a flowchart of an illustrative embodiment of a method for reader positioning in SMR.

FIG. 7 is a flowchart of an illustrative embodiment of a method for reader positioning in shingled magnetic recording, generally designated 700. The method 700 may comprise receiving a read command, such as a read command received at a DSD from a host, at 702. The read command may include target logical block addresses (LBAs) to be read. The DSD can then use the target LBAs to determine in which zone of the data storage medium the data is stored, and which head will be used to read the data, at 704.

The DSD may then determine whether the data is located in a zone formatted to use shingled magnetic recording, at 706. In some embodiments, a single zone may include both shingled and non-shingled recording areas, in which case the DSD may determine whether the target data is in a shingled area of a zone. If the target zone or area is not shingled, the DSD may simply apply the geometry microjog to determine the proper read head positioning, at 708. The DSD may then read the data using the determined read head positioning, at 710.

If the DSD determines that the target zone or area is shingled, at 706, the DSD may consult a squeeze microjog table to determine the appropriate squeeze microjog value for the target zone and head, at 712. For example, the squeeze microjog table may be stored in RAM, in a nonvolatile solid state memory, a memory of a controller of the DSD, or some other memory. The DSD may then apply the geometry microjog value as well as the squeeze microjog values for the target head and zone to determine the read head positioning, at 714. The DSD may then read the data using the determined read head positioning, at 710.

In some embodiments, a DSD may simply consult a squeeze microjog table for ever read operation, at 712, and not determine whether the target zone is shingled at 706. If the target zone is not shingled, the squeeze microjog table will simply have a null value or 0 value for the squeeze offset, resulting in only using the geometry microjog.

Figure 8:
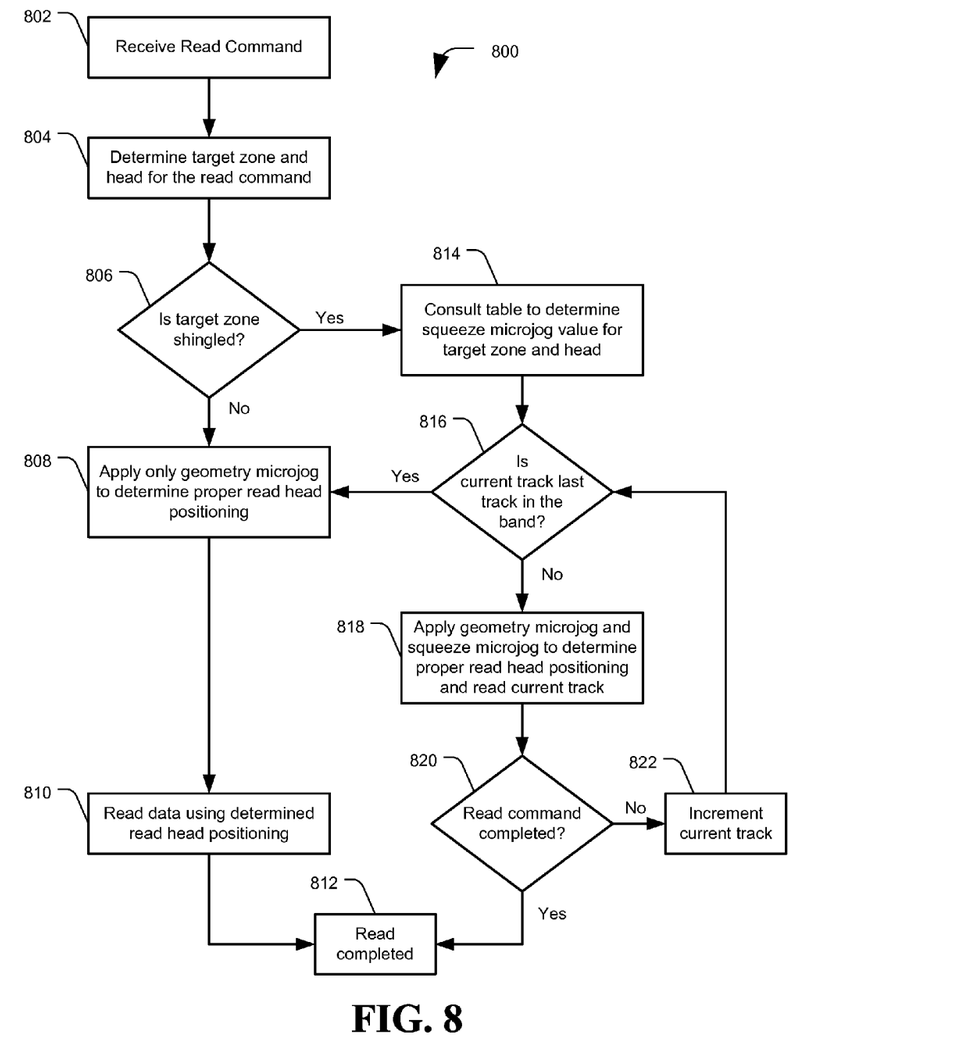
FIG. 8 is a flowchart of yet another illustrative embodiment of a method for reader positioning in SMR.

FIG. 8 is a flowchart of an illustrative embodiment of a method for reader positioning in shingled magnetic recording, generally designated 800. The method 800 may comprise receiving a read command at a DSD, at 802, and determining the target zone and head for the read command, at 804. The DSD may determine whether the target zone is formatted for shingled magnetic recording, at 806. If not, the DSD may apply only the geometry microjog value to determine the proper read head positioning, at 808. The DSD can then read the data using the determined read head positioning at 810, and complete the read operation at 812.

If the target zone is determined to have shingled recording areas, at 806, the DSD may consult a table to determine the squeeze microjog value for the target zone and head, at 814. Here, the DSD may proceed with the read operation on a track-by-track basis, and determine if the current track is the last track in a shingled band of tracks, at 816. If it is, the track will not be partially overlapped by another track, and no squeeze microjog value needs to be applied. The DSD can apply only the geometry microjog value to determine proper read head positioning, at 808.

If the current track is not the last track in the band, at 816, the DSD may apply the geometry microjog value and the squeeze microjog value to determine the proper read head positioning and read the current track, at 818. The DSD may next check if the read command is completed, at 820. If not, the current track is incremented to the next track in the band, at 822, and a determination is made as to whether the current track is the last track in the band, at 816. If the read command is completed, at 820, the read operation ends at 812.

In some embodiments, the values stored in the squeeze microjog table may be the combination of the geometry microjog value and the squeeze microjog value, if any, resulting the final read head offset value. This would eliminate the need to perform additional computations during read commands.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
    a processor configured to:
        receive a read command to retrieve data from a data storage medium having data stored in a shingled manner where at least one track is partially overlapped by an adjacent track;
        retrieve a squeeze offset value from a memory based on a location of the data on the data storage medium, the squeeze offset value based on an amount of overwrite of a shingled data track by an adjacent data track; and
        adjust a position of a read element according to the squeeze offset value to retrieve the data.

2. The apparatus of claim 1 further comprising the squeeze offset value is determined by a distance between a center of a track during a write operation and a center of a non-overlapped portion of the track.

3. The apparatus of claim 1 further comprising the processor configured to:
    adjust the position of the read element according to the squeeze offset value and a reader-to-writer offset based on a distance between a write element and the read element.

4. The apparatus of claim 1 further comprising:
    the read command includes a target address of the data;
    the processor is further configured to:
        determine the location of the data based on the target address; and
        select the read element from a plurality of read elements.

5. The apparatus of claim 4 comprising the processor further configured to:
    determine whether data in a target zone having the target address has data stored in a shingled manner;
    when the target zone has data stored in a shingled manner:
        retrieve the squeeze offset value from memory based on the location of the data on the data storage medium;
        adjust the position of the read element according to the squeeze offset value; and
    when the target zone does not have data stored in a shingled manner:
        adjust the position of the read element according to a reader-to-writer offset based on a distance between a write element and the read element.

6. The apparatus of claim 5 comprising the processor further configured to:
    when the target zone has data stored in a shingled manner:
        determine whether a current track to be read is partially overlapped by an adjacent track;
        when the current track to be read is partially overlapped:
            adjust the position of the read element according to the squeeze offset value;
            read the current track;
        when the current track to be read is not partially overlapped:
            adjust the position of the read element according to a reader-to-writer offset based on the distance between a write element and the read element;
            read the current track; and
        when the read operation is not completed, increment the current track to a next track to be read.

7. The apparatus of claim 1, further comprising the squeeze offset value includes a reader-to-writer offset value based on a distance between a write element and the read element.

8. The apparatus of claim 1 further comprising the squeeze offset value is nominal when a target track to be read is not partially overlapped by an adjacent track.

9. The apparatus of claim 1 further comprising:
    the data storage medium including a plurality of data zones;
    a plurality of read elements to read data from the data storage medium; and
    the squeeze offset value is variable per data zone and per read element.

10. A method comprising:
    receiving at a data storage device a read command to retrieve data from a data storage medium, the data stored in a shingled manner where at least one track is partially overlapped by an adjacent track;
    selecting a squeeze offset value from a list of squeeze offset values stored in a memory, the squeeze offset value based on an amount of overwrite of a shingled data track by an adjacent data track, the list of squeeze offset values determined based on a location of the data on the data storage medium; and adjusting a position of a read element according to the squeeze offset value.

11. The method of claim 10 further comprising determining the squeeze offset value based on a distance between a center of a track during a write operation and a center of a non-overlapped portion of the track.

12. The method of claim 10 further comprising:
adjusting the position of the read element according to the squeeze offset value and a geometry offset of a distance between a write element and the read element.

13. The method of claim 10 further comprising the list of squeeze offset values includes a squeeze offset value for each zone of the data storage medium.

14. The method of claim 13 further comprising:
determining whether data in a target zone having the target address has data stored in a shingled manner;
when the target zone has data stored in a shingled manner:
selecting the squeeze offset value associated with the target zone based on the location of the data on the data storage medium;
adjusting the position of the read element according to the squeeze offset value; and
when the target zone does not have data stored in a shingled manner:
adjusting the position of the read element according to a geometry offset based on a distance between a write element and the read element.

15. The method of claim 14 further comprising:
when the target zone has data stored in a shingled manner:
determining whether a current track to be read is partially overlapped by an adjacent track;
when the current track to be read is partially overlapped:
adjusting the position of the read element according to the squeeze offset value;
reading the current track;
when the current track to be read is not partially overlapped:
adjusting the position of the read element according to the geometry offset;
reading the current track; and
when the read operation is not completed, incrementing the current track to a next track to be read.

16. The method of claim 10, further comprising the squeeze offset value includes a geometry offset value based on a distance between a write element and the read element.

17. The method of claim 10 further comprising the squeeze offset value is nominal when a target track to be read is not partially overlapped by an adjacent track.

18. A system comprising:
a data storage medium configured to store data in a shingled manner where at least one track is partially overlapped by an adjacent track;
a read element to read data from the data storage medium;
a processor configured to:
receive a read command to retrieve data from the data storage medium;
when the data is stored to a shingled portion of the data storage medium:
retrieve a squeeze offset value from a memory based on a location of the data on the data storage medium, the squeeze offset value based on an amount of overwrite of a shingled data track by an adjacent data track; and
adjust a position of the read element according to the squeeze offset value.

* * * * *